United States Patent Office 3,661,905
Patented May 9, 1972

3,661,905
TETRAHYDROQUINOXALINE DERIVATIVES
Kurt Ley, Odenthal-Globusch, Roland Nast, Cologne-Buchheim, Wolfgang Redetzky, Opladen-Quettingen, and Theo Kempermann, Cologne-Lindenthal, Germany, assignors to Farbenfabriken Bayer Aktiengesellschaft, Leverkusen, Germany
No Drawing. Filed Sept. 10, 1969, Ser. No. 856,796
Claims priority, application Germany, Sept. 13, 1968,
P 17 95 325.2, P 17 95 326.3
Int. Cl. C07d 51/78
U.S. Cl. 260—250
10 Claims

ABSTRACT OF THE DISCLOSURE

The present invention relates (1) to rubber products that are unaffected by ozone (2) to anti-ozonants that may be used in the production of these ozone-resistant rubber products, and (3) to the preparation of these anti-ozonants corresponding to the general formula:

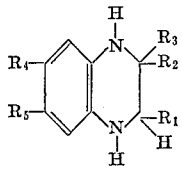

---

The present invention relates to rubber products that are unaffected by ozone, to anti-ozonants that may be used in the production of these ozone-resistant rubber products and to the preparation of these anti-ozonants.

Consumer goods manufactured by vulcanisation from natural or synthetic rubber are known to develop cracks when their surface is under mechanical strain and exposed to atmospheric influences. The mechanical strain may be constant in time (static) or periodically variable (dynamic). It is known that it is the ozone present in low concentrations in the atmosphere which is responsible for the development of these cracks, and that it is primarily the choice of the elastomers used for the products in question that is of crucial importance to their resistance to this type of crack growth. For example, completely or substantially saturated elastomers such as silicone rubber or butyl rubber are highly resistant to degradation phenomena of this kind. By contrast, it is precisely these types of elastomer which are most commonly used in the rubber industry that are the most susceptible to cracking, namely natural rubber and synthetic unsaturated rubber, such as for example butadiene-styrene rubber.

We have now found that compounds corresponding to the general formula:

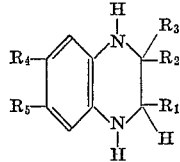

in which $R_1$ represents hydrogen or methyl,
$R_2$ and $R_3$ represent hydrocarbon radicals with up to 4 carbon atoms which together may also form a saturated carbocyclic ring or a methyl substituted saturated carbocyclic ring, and
$R_4$ and $R_5$ represent hydrogen or optionally substituted alkyl radicals with 1 to 12 carbon atoms or methoxy or ethoxy groups, one of the radicals $R_4$ and $R_5$ representing hydrogen when the other represents an alkyl radical with from 2 to 12 carbon atoms or a methoxy or ethoxy group, are particularly suitable for use as anti-ozonants in natural rubber and synthetic unsaturated rubber.

When subjected to static testing, the rubber products protected by the compounds used in accordance with the invention show substantial advantages over those protected with compounds of the kind mentioned in French patent specification No. 1,420,036, that is to say, the beginning of crack growth is delayed to an even greater extent, whilst the growth of the cracks themselves is further retarded. In addition, the compounds according to the invention aso protect the rubber product against the influence of oxygen.

The compounds used in accordance with the invention may be satisfactorily incorporated in the rubber. They are used for example in quantities of from 0.1 to 5.0 parts by weight, and are preferably in quantities of from 0.5 to 3.0 parts by weight, based on the elastomer.

The anti-ozonants used in accordance with the invention may be mixed into the polymer to be protected together with the usual additives and hence also in conjunction with other anti-ozonants.

The anti-ozonants used in accordance with the invention may be employed in natural rubber and unsaturated synthetic rubbers containing double bonds, for example, in polymers of butadiene, isoprene, dimethyl butadiene and their homologues, also in copolymers of conjugated diolefins with polymerisable vinyl compounds such as, for example, styrene, methyl styrene, divinyl benzene, acrylonitrile, methacrylonitrile, acrylates or methacrylates, and in copolymers obtained from isoolefins, such as isobutylene or its homologues, and small quantities of conjugated diolefins. It is also possible to protect polymers of the kind obtained from chlorobutadiene, and also copolymers of chlorobutadiene with mono and/or diolefins or polymerisable vinyl compounds.

Table 1 contains examples of the compounds used in accordance with the invention:

TABLE 1

3,3-dimethyl-1,2,3,4-tetrahydroquinoxaline;
3,3,6- or 3,3,7-trimethyl-1,2,3,4-tetrahydroquinoxaline;
2,3,3-trimethyl-1,2,3,4-tetrahydroquinoxaline;
2,3,3,6- or 2,3,3,7-tetramethyl-1,2,3,4-tetrahydroquinoxaline;
2,3,3,5-tetramethyl-1,2,3,4-tetrahydroquinoxaline;
2,3,3,5,7-pentamethyl-1,2,3,4-tetrahydroquinoxaline;
3-ethyl-3-n-butyl-1,2,3,4-tetrahydroquinoxaline;
3-ethyl-3-n-butyl-6- or 3-ethyl-3-n-butyl-7-methyl-1,2,3,4-tetrahydroquinoxaline;
3-spirocyclohexyl-1,2,3,4-tetrahydroquinoxaline;
3-spirocyclohexyl-6- or 3-spirocyclohexyl-7-methyl-1,2,3,4-tetrahydroquinoxaline;
2-methyl-3-spirocyclohexyl-1,2,3,4-tetrahydroquinoxaline;
3,3-dimethyl-6- or 3,3-dimethyl-7-tert.-butyl-1,2,3,4-tetrahydroquinoxaline;
3,3-dimethyl-6- or 3,3-dimethyl-7-i-nonyl-1,2,3,4-tetrahydroquinoxaline;
3,3-dimethyl-6- or 3,3-dimethyl-7-tert.-dodecyl-1,2,3,4-tetrahydroquinoxaline;
3,3-dimethyl-6- or 3,3-dimethyl-7-methoxy-1,2,3,4-tetrahydroquinoxaline; and
3,3-dimethyl-6- or 3,3-dimethyl-7-ethoxy-1,2,3,4-tetrahydroquinoxaline.

The compounds used in accordance with the invention may be obtained by condensing o-phenylene diamines with corresponding α-halogen ketones to form dihydroquinoxalines, followed by catalytic reduction:

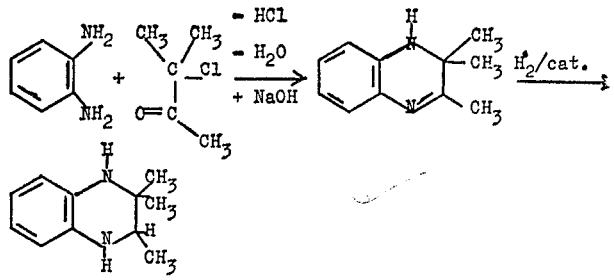

We have also found that the optionally substituted 3,3-dialkyl-tetrahydroquinoxalines can be obtained by hydrogenating optionally substituted 2-alkylamino-3,3-dialkyl-dihydroquinoxaline-di-N-oxides initially at temperatures around room temperature (for example, from 20° C. to 30° C.), and then splitting off the amine radical through reduction by continuing hydrogenation at elevated temperature, i.e., at temperatures of from approximately 60° C. to 200° C. The 3,3-dialkyl-tetrahydroquinoxalines that are otherwise impossible or extremely difficult to obtain are formed in this way.

The course followed by the reaction is illustrated by the following reaction scheme:

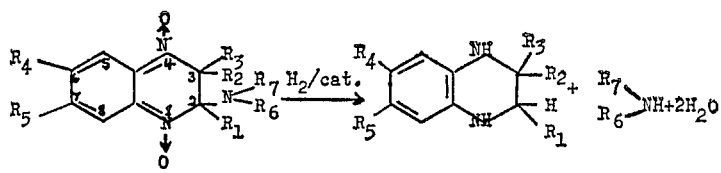

In the above formulae, $R_4$ and $R_5$ represent hydrogen or optionally substituted alkyl radicals with 1 to 12 carbon atoms or methoxy or ethoxy groups, one of the radicals $R_4$ and $R_5$ representing hydrogen when the other represents an alkyl radical with from 2 to 12 carbon atoms or a methoxy or ethoxy group, $R_1$ represents hydrogen or lower alkyl, $R_6$ represents hydrogen or alkyl radicals, and $R_7$ represents alkyl or cyclo-alkyl radicals, and in addition $R_6$ and $R_7$ may optionally form together a ring which may contain another hetero atom such as N, S or O, whilst $R_2$ and $R_3$ represent an alkyl radical and may be joined together to form a carbocyclic ring which may optionally contain methyl groups and which in the starting material may also contain a double bond. The radicals $R_6$ and $R_7$ may for example contain 1 to 12 carbon atoms, whilst the radical $R_1$ is preferably a lower alkyl radical with up to 4 carbon atoms.

The alkyl radicals $R_4$ and $R_5$ may contain, for example, from 1 to 12 carbon atoms and may be substituted by further radicals, for example, by lower alkoxy radicals such as methoxy, ethoxy or propoxy radicals, or a halogen such as chlorine. Reduction may be carried out in the usual way in solvents such as alcohols and ethers, especially methanol and tetrahydrofuran.

In the first stage of reduction, the oxygens of the N-oxide groups are removed by reduction at temperatures of for example from —20° C. to 40° C. and preferably from —10° C. to 30° C. The reaction is then completed at elevated temperatures, for example, at temperatures of from 60° C. to 200° C. and preferably at temperatures of from 70° C. to 150° C., accompanied by elimination of the amine radical through reduction.

The reaction products may be worked up by precipitation with water or by distilling the compounds formed.

Examples of the reduction catalysts for the process include both noble metals such as platinum and palladium and Raney nickel, Raney cobalt and nickel on supporting materials.

The following 2 - alkylamino-2,3-dihydro-3,3-dialkyl-quinoxaline-di-N-oxides are mentioned as examples of starting materials for this process:

2-methylamino-3,3-dimethyl-,
2-ethylamino-3,3-dimethyl-,
2-cyclohexylamino-3,3-dimethyl-,
2-cyclohexylamino-3,3-dimethyl-6- or -7-methyl,
2-cyclohexylamino-3,3-dimethyl-6- or -7-methoxy-,
2-cyclohexylamino-3,3-dimethyl-6- or -7-ethoxy-,
2-cyclohexylamino-3,3-dimethyl-6- or -7-chloro-,
2-morpholino-3,3-dimethyl-,
2-piperidino-3,3-dimethyl-,
2-pyrrolidino-3,3-dimethyl-, 2-cyclohexylamino-3,3-dimethyl-,
2-cyclohexylamino-3,3-dimethyl-6- or -7-methyl-,
2-cyclohexylamino-3,3-dimethyl-6- or -7-methoxy-,
2-cyclohexylamino-3,3-dimethyl-6- or -7-ethoxy-,
2-cyclohexylamino-3-spiro-cyclohexenyl-,
2-cyclohexylamino-3-spiro-methylcyclohexenyl-6- or -7-methyl-,
2-morpholino-3,3-dimethyl-6- or -7-methyl-,
2-cyclohexylamino-2-methyl-3,3-dimethyl- and 2-piperidino-2-methyl-3,3-dimethyl-6- or -7-methoxy-2,3-dihydroquinoxaline-di-N-oxide.

The following are mentioned as examples of compounds that can be prepared by this process:

3,3-dimethyl-1,2,3,4-tetrahydroquinoxaline,
3,3-dimethyl-6- or -7-methyl-1,2-3,4-tetrahydroquinoxaline,
3,3-dimethyl-6- or -7-methoxy-1,2-3,4-tetrahydroquinoxaline,
3,3-dimethyl-6- or -7-ethoxy-1,2-3,4-tetrahydroquinoxaline,
2-methyl-3,3-dimethyl-1,2-3,4-tetrahydroquinoxaline,
2-methyl-3,3-dimethyl-6- or -7-methyl-1,2-3,4-tetrahydroquinoxaline,
3-spiro-cyclohexyl-1,2-3,4-tetrahydroquinoxaline,
3-spiro-cyclohexyl-6- or -7-methyl-1,2-3,4-tetrahydroquinoxaline,
3-spiro-cyclohexyl-6- or -7-ethoxy-1,2-3,4-tetrahydroquinoxaline,
3-spiro-methylcyclohexyl-1,2-3,4-tetrahydroquinoxaline, and
3-spiro-methylcyclohexyl-6- or -7-methyl-1,2-3,4-tetrahydroquinoxaline.

The 2 - alkylamino - 3,3 - dialkyldihydroquinoxaline-di-N-oxides used as starting materials can be obtained by reacting benzofuroxanes with ketimines or enamines. The course followed by the reaction of methyl-benzofuroxane with e.g. N-cyclohexyl-1-methyl-2,2-dimethyl-ketimine is illustrated by the following reaction scheme:

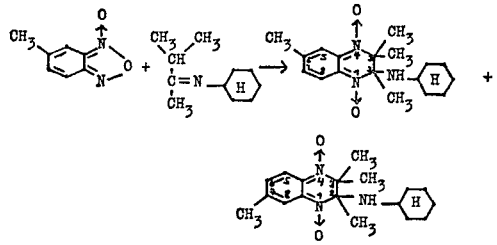

The resulting final product is a mixture of 2-cyclohexyl-amino-2-methyl-3,3-dimethyl-6- and -7-methyl-2,3-dihydroquinoxaline-di-N-oxide due to one methyl group being substituent of the benzo nucleus. The 6-position isomer appears to be the main product in all cases where the benzofuroxane used in this reduction carries one substituent.

The invention is illustrated by the following examples:

EXAMPLE 1

The following mixtures suitable for use in the treads of vehicle tyres were prepared on laboratory mixing rolls:

| | Parts by weight |
|---|---|
| Oil-extended styrene butadiene rubber (37.5 parts by weight of oil to 100.0 parts by weight of elastomer) | 100.0 |
| Zinc oxide | 5.0 |
| ISAF carbon black | 55.0 |
| Mineral oil plasticiser | 4.0 |
| Paraffin | 0.6 |
| Stearic acid | 2.0 |
| 2-benzothiazyl-N-cyclohexylsulphenamide | 1.3 |
| Sulphur | 1.6 |
| Anti-ozonant (see below) | 0 and 2.0 |

Test specimens measuring 0.4 x 4.5 x 4.5 cm. and 0.4 x 4.5 x 5.5 cm. were prepared from these mixtures and vulcanised in a press for 30 minutes at 151° C. The test specimens were then clamped in a plastics frame in such a way that elongations of 10, 20, 35 and 60% were produced over their surface. The test specimens thus bent were weathered without any cover in a southerly direction. Crack growth was assessed at certain intervals as specified in the following table on the basis on the total number of cracks visible with the naked eye and also their average length in accordance with the following scheme:

Number of cracks

| | |
|---|---|
| No cracks | 0 |
| 1–3 cracks | 1 |
| 4–9 cracks | 2 |
| 10–27 cracks | 3 |
| 28–81 cracks | 4 |
| 82–243 cracks | 5 |
| More than 244 cracks | 6 |

Average length of the cracks

| | |
|---|---|
| No cracks visible | 0 |
| Cracks just visible, up to 1 mm. | 1 |
| 1 to 3 mm. | 2 |
| 3 to 8 mm. | 3 |
| Longer than 8 mm. | 4 |

In the following tables, the results of the two assessments are separated by an oblique line, the number of cracks being shown first in each case.

(a) No addition:

| Elongation (percent) | Evaluation after— | | | | | |
|---|---|---|---|---|---|---|
| | 0 days | 7 days | 14 days | 21 days | 28 days | 42 days |
| 10 | 0/0 | 0/0 | 5/1 | 5/1 | 5/2 | 5/2 |
| 20 | 0/0 | 3/1 | 6/1 | 6/1 | 6/2 | 6/2 |
| 35 | 0/0 | 4/1 | 6/1 | 6/1 | 6/2 | 6/2 |
| 60 | 0/0 | 5/1 | 6/1 | 6/1 | 6/2 | 6/2 |

(b) 2.0 parts by weight of 2,3,6- or -7-trimethyl-1,2,3,4-tetrahydroquinoxaline from French Pat. No. 1,420,036 (by way of comparison):

| Elongation (percent) | Evaluation after— | | | | | |
|---|---|---|---|---|---|---|
| | 0 days | 7 days | 14 days | 21 days | 28 days | 42 days |
| 10 | 0/0 | 0/0 | 0/0 | 0/0 | 4/1.5 | 5/2 |
| 20 | 0/0 | 0/0 | 2/1 | 2/1 | 5/2 | 6/2 |
| 35 | 0/0 | 0/0 | 3/1 | 3/1 | 5/2 | 6/2 |
| 60 | 0/0 | 3/1 | 5/1 | 5/1 | 5/2 | 6/2 |

(c) 2.0 parts by weight of 3,3,6- or -7-trimethyl-1,2,3,4-tetrahydroquinoxaline:

| Elongation (percent) | Evaluation after— | | | | | |
|---|---|---|---|---|---|---|
| | 0 days | 7 days | 14 days | 21 days | 28 days | 42 days |
| 10 | 0/0 | 0/0 | 0/0 | 0/0 | 0/0 | 0/0 |
| 20 | 0/0 | 0/0 | 0/0 | 0/0 | 0/0 | 0/0 |
| 35 | 0/0 | 0/0 | 0/0 | 0/0 | 0/0 | 0/0 |
| 60 | 0/0 | 0/0 | 0/0 | 0/0 | 2/1 | 3/2 |

(d) 2.0 parts by weight of 3,3-dimethyl-1,2,3,4-tetrahydroquinoxaline:

| Elongation (percent) | Evaluation after— | | | | | |
|---|---|---|---|---|---|---|
| | 0 days | 7 days | 14 days | 21 days | 28 days | 42 days |
| 10 | 0/0 | 0/0 | 0/0 | 0/0 | 0/0 | 0/0 |
| 20 | 0/0 | 0/0 | 0/0 | 0/0 | 0/0 | 0/0 |
| 35 | 0/0 | 0/0 | 0/0 | 0/0 | 0/0 | 2/1 |
| 60 | 0/0 | 0/0 | 0/0 | 0/0 | 3/1 | 3/2 |

(e) 2.0 parts by weight of 3-spiro-cyclohexyl-6- or -7-methyl-1,2,3,4-tetrahydroquinoxaline:

| Elongation (percent) | Evaluation after— | | | | | |
|---|---|---|---|---|---|---|
| | 0 days | 7 days | 14 days | 21 days | 28 days | 42 days |
| 10 | 0/0 | 0/0 | 0/0 | 0/0 | 0/0 | 0/0 |
| 20 | 0/0 | 3/2 | 3/2 | 4/2 | 4/2 | 4/2 |
| 35 | 0/0 | 4/2 | 4/2 | 5/2 | 5/2 | 5/2 |
| 60 | 0/0 | 5/2 | 5/2 | 6/2 | 6/2 | 6/2 |

(f) 2.0 parts by weight of 2,3,3,6- or -7-tetramethyl-1,2,3,4-tetrahydroquinoxaline:

| Elongation (percent) | Evaluation after— | | | | | |
|---|---|---|---|---|---|---|
| | 0 days | 7 days | 14 days | 21 days | 28 days | 42 days |
| 10 | 0/0 | 0/0 | 0/0 | 0/0 | 0/0 | |
| 20 | 0/0 | 0/0 | 0)0 | 0/0 | 3/1 | |
| 35 | 0/0 | 0/0 | 0/0 | 2/1 | 3/1.5 | |
| 60 | 0/0 | 0/0 | 0/0 | 3/1 | 4/2 | |

(g) 2.0 parts by weight of 2,3,3-trimethyl-1,2,3,4-tetrahydroquinoxaline:

| Elongation (percent) | Evaluation after— | | | | | |
|---|---|---|---|---|---|---|
| | 0 days | 7 days | 14 days | 21 days | 28 days | 42 days |
| 10 | 0/0 | 0/0 | 0/0 | 0/0 | 0/0 | |
| 20 | 0/0 | 0/0 | 0/0 | 0/0 | 0/0 | |
| 35 | 0/0 | 0/0 | 0/0 | 0/0 | 2/1 | |
| 60 | 0/0 | 0/0 | 0/0 | 0/0 | 3/1 | 3/2 |

EXAMPLE 2

The following mixtures were prepared on laboratory mixing rolls:

| | Parts by weight |
|---|---|
| Smoked sheets | 100.0 |
| ISAF carbon black | 48.0 |
| Zinc oxide | 5.0 |
| Mineral oil plasticiser | 4.0 |
| Stearic acid | 3.0 |
| Paraffin | 0.6 |
| Sulphur | 2.2 |
| 2-benzthiazyl-N-cyclohexyl sulphenamide | 0.6 |
| Anti-ozonant (see below) | 0 and 2.0 |

As described in Example 1, test specimens were prepared from these mixtures and vulcanised in a press for 25 minutes at 143° C. The test conditions were again the same as in Example 1. Similarly, crack growth was assessed as in Example 1.

(a) No addition:

| Elongation (percent) | Evaluation after— | | | | | |
|---|---|---|---|---|---|---|
| | 0 days | 7 days | 14 days | 21 days | 28 days | 42 days |
| 10 | 0/0 | 0/0 | 5/1 | 6/2 | 6/2 | 6/2 |
| 20 | 0/0 | 0/0 | 6/1 | 6/2 | 6/2 | 6/2 |
| 35 | 0/0 | 0/0 | 6/1 | 6/2 | 6/2 | 6/2 |
| 60 | 0/0 | 0/0 | 6/1 | 6/2 | 6/2 | 6/2 |

(b) 2.0 parts by weight of 3,3-dimethyl-1,2,34-tetrahydroquinoxaline:

| Elongation (percent) | Evaluation after— | | | | | |
|---|---|---|---|---|---|---|
| | 0 days | 7 days | 14 days | 21 days | 28 days | 42 days |
| 10 | 0/0 | 0/0 | 0/0 | 0/0 | 0/0 | 0/0 |
| 20 | 0/0 | 0/0 | 0/0 | 0/0 | 0/0 | 0/0 |
| 35 | 0/0 | 0/0 | 0/0 | 3/1 | 3/1 | 3/1 |
| 60 | 0/0 | 0/0 | 0/0 | 3/1 | 4/1 | 4/1.5 |

(c) 2.0 parts by weight of 3,3,6- or -7-trimethyl-1,2,3,4-tetrahydroquinoxaline:

| Elongation (percent) | Evaluation after— | | | | | |
|---|---|---|---|---|---|---|
| | 0 days | 7 days | 14 days | 21 days | 28 days | 42 days |
| 10 | 0/0 | 0/0 | 0/0 | 0/0 | 0/0 | 0/0 |
| 20 | 0/0 | 0/0 | 0/0 | 0/0 | 0/0 | 0/0 |
| 35 | 0/0 | 0/0 | 0/0 | 0/0 | 0/0 | 0/0 |
| 60 | 0/0 | 0/0 | 0/0 | 0/0 | 4/1 | 4/1.5 |

EXAMPLE 3

3,3-dimethyl-6- or -7-methyl tetrahydroquinoxaline (I)

630 g. (2.80 mols) of a mixture of 2-cyclohexylamino-3,3-dimethyl-6- and -7-methydihydroquinoxaline - di - N-oxide are introduced together with 120 g. of Raney nickel into 2.5 litres of methanol and hydrogenated in an autoclave at 25° C. After the hydrogen has been absorbed, the temperature is increased to 100° C. and hydrogenation is completed at 150° C. After the catalyst has been filtered off and the solvent distilled off together with cyclohexylamine formed, the residue is distilled 270 g. of B.P.$_{0.3}$ 115–125° C. are obtained. The distillate solidifies and melts at 59° C. to 60° C. after dissolution in and reprecipitation from petrol.

*Analysis.*—$C_{11}H_{16}N_2$ (176). Calculated (percent): N, 15.92. Found (percent): N, 15.9.

The product obtained is a mixture consisting of 3,3-dimethyl-6-methyl-tetrahydroquinoxaline and 3,3-dimethyl-7-methyl-tetrahydroquinoxaline. The mixture is separated into its two constituents by chromatography. The compounds set out in the table were similarly obtained from the corresponding starting materials:

| Number | Formula | B.P. (mm./° C.) | M.P. (° C.) | Analysis Calculated | | | Found | | | Yield in percent of theoretical |
|---|---|---|---|---|---|---|---|---|---|---|
| | | | | C | H | N | C | H | N | |
| II | 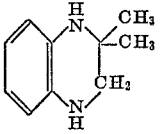 | | 44–45 | 74.0 | 8.64 | 17.26 | 73.9 | 8.7 | 17.1 | 49.0 |
| III | 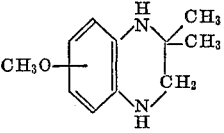 | 0.4/130–133 | | 68.7 | 8.33 | 14.56 | 68.7 | 8.8 | 14.4 | 64.5 |
| IV | 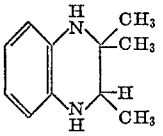 | | 58–60 | 74.9 | 9.1 | 15.9 | 75.1 | 9.2 | 15.9 | 43 |
| V | 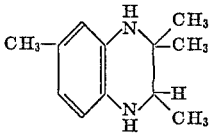 80% / 20% | | 37–38 | 75.8 | 9.48 | 14.73 | 76.0 | 9.5 | 15.0 | 70.5 |
| VI | 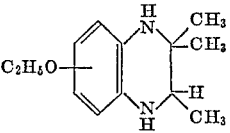 | 0.5/132–137 | | 70.8 | 9.0 | 12.73 | 71.0 | 9.3 | 12.5 | 30 |
| VII | 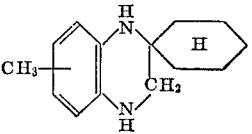 | 0.4/155–165 | | 77.4 | 9.67 | 12.91 | 77.4 | 9.7 | 13.4 | 70 |

The starting material required for the preparation of IV is obtained as follows:

85.5 g. of benzofuroxan and 105 g. of N-cyclohexyl-1-methyl-2,2-dimethyl ketimine (Schiff's base of cyclohexylamine and methyl isopropylketone) are introduced while stirring into 400 ml. of methanol. There is a rise in temperature to 25° C., accompanied by dissolution. 100 g. of 2-cyclohexylamino-2-methyl - 3,3 - dimethyl-dihydroquinoxaline-di-N-oxide crystallised out over a period of 12 hours. After dissolution in and reprecipitation from methanol, the red crystals melt at 129–131° C.

$C_{17}H_{25}N_3O_2$ (301).—

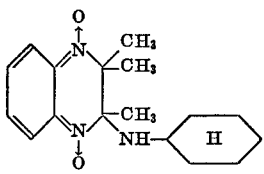

Calculated (percent): C, 67.2; H, 8.31; N, 13.95. Found (percent): C, 67.2; H, 8.6; N, 13.95.

The starting materials for V and VI are similarly obtained with the correspondingly substituted benzofuroxans:

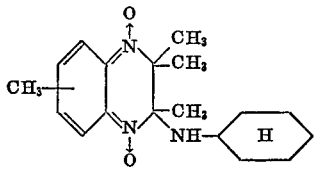

M.P. 147–148° C. red crystals

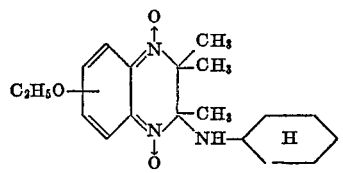

M.P. 128–130° C. red crystals

EXAMPLE 4

(a) 36 g. (0.3 mol) of 2-chloro-2-methyl-3-butanone are introduced into a suspension of 33 g. (0.3 mol) of o-phenylene diamine in 150 ml. of methanol, and the resulting product is heated to boiling point over a period of 4 hours. It is then cooled, 20 ml. of a 45% aqueous NaOH solution and 150 ml. of water are added, and the deposit precipitated is suction-filtered and washed with methanol/water in a ratio by volume of 1:1. 2,3,3-trimethyl-3,4-dihydroquinoxaline is obtained in a yield of 39 g. (75% of the theoretical) in the form of beige-coloured crystals which melt at 143–148° C. following dissolution in, and reprecipitation from, benzene/light petrol.

*Analysis.*—$C_{11}H_{14}N_2$ (174.2). Calculated (percent): C, 75.8; H, 8.1; N, 16.1. Found (percent): C, 75.7; H, 8.2; N, 16.1.

(b) 20 g. of Raney nickel "B" are added to a solution of 61 g. of 2,3,3-trimethyl-3,4-dihydroquinoxaline in 300 ml. of tetrahydrofuran, and the resulting product is reduced with hydrogen in an autoclave at 110° C. The catalyst is then filtered off, the solvent is distilled off in vacuo and the oily residue is dissolved in light petrol. After standing for a limited period, crystals are precipitated, being filtered under suction and washed with light petrol. 2,3,3-trimethyl-1,2,3,4-tetrahydroquinoxaline is obtained in a yield of 30 g. in the form of yellowish crystals melting at 65° C. to 67° C.

The product is identical with 2,3,3-trimethyl-1,2,3,4-tetrahydroquinoxaline (substance No. III) prepared in accordance with Example 3.

What we claim is:
1. A compound corresponding to the formula

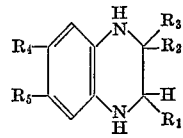

in which $R_1$ represents hydrogen or methyl, $R_2$ and $R_3$ represent hydrocarbon radicals with up to 4 carbon atoms which may also be attached to one another to form a 6 membered saturated carbocyclic ring which may be substituted by methyl groups, and $R_4$ and $R_5$ represent hydrogen or alkyl radicals with 1 to 12 carbon atoms or methoxy or ethoxy groups, one of the radicals $R_4$ and $R_5$ representing hydrogen when the other represents an alkyl radical with from 2 to 12 carbon atoms or a methoxy or ethoxy group.

2. The compound of claim 1 having the formula

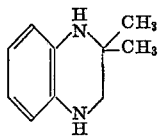

3. The compound of claim 1 having the formula

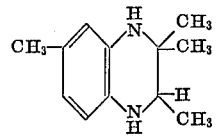

4. The compound of claim 1 having the formula

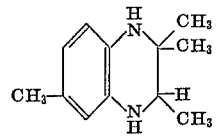

5. The compound of claim 1 having the formula

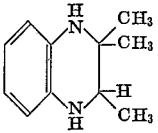

6. The compound of claim 1 having the formula

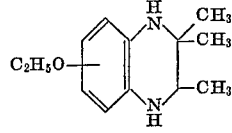

7. The compound of claim 1 having the formula

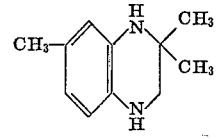

8. The compound of claim 1 having the formula

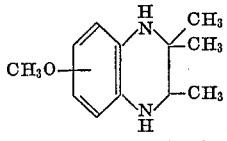

9. The compound of claim 1 having the formula

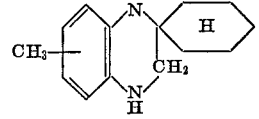

10. Process for the production of a compound corresponding to the formula

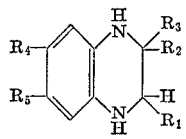

in which $R_1$ represents hydrogen or methyl,
$R_2$ and $R_3$ represent hydrocarbon radicals with up to 4 carbon atoms which may also be attached to one another to form a 6 membered saturated carbocyclic ring which may be substituted by methyl groups, and
$R_4$ and $R_5$ represent hydrogen or alkyl radicals with 1 to 12 carbon atoms or methoxy or ethoxy groups characterised by hydrogenating a dihydroquinoxaline-di-N-oxide of the formula

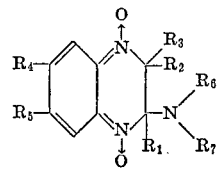

in which $R_1$, $R_2$, $R_3$, $R_4$ and $R_5$ have the meaning given above,
$R_6$ denotes hydrogen or an alkyl radical and
$R_7$ represents an alkyl or cycloalkyl radical, and in addition $R_6$ and $R_7$ may also form a ring which may contain another heteroatom being N, S or O initially at temperatures of from −20° C. to 40° C. and thereafter eliminating the amine radical of the formula

in which $R_6$ and $R_7$ have the meaning given above, by continuing hydrogenation at temperatures of from approximately 60° C. to 200° C.

References Cited
UNITED STATES PATENTS 3,291,757  12/1966  Sturm et al. _____ 260—250 R NICHOLAS S. RIZZO, Primary Examiner U.S. Cl. X.R.

260—45.8 A